United States Patent [19]
Bertalan et al.

[11] Patent Number: 6,130,487
[45] Date of Patent: Oct. 10, 2000

[54] ELECTRONIC INTERFACE AND METHOD FOR CONNECTING THE ELECTRICAL SYSTEMS OF A TRUCK AND TRAILER

[75] Inventors: Richard P. Bertalan, Arlington; Lew E. Plummer, LaConner; Jon M. Quigley, Mount Vernon; Jeffrey E. Bargewell, Burlington, all of Wash.

[73] Assignee: PACCAR Inc, Bellevue, Wash.

[21] Appl. No.: 09/253,314

[22] Filed: Feb. 19, 1999

[51] Int. Cl.[7] ........................................... B60D 1/62
[52] U.S. Cl. .................... 307/9.1; 340/310.01; 340/431; 340/538; 340/825.06
[58] Field of Search .................... 307/10.1, 9.1; 340/825.06, 538, 431, 310.01; 280/423.1, 656; 180/14.2

[56] References Cited

U.S. PATENT DOCUMENTS

| | | | |
|---|---|---|---|
| 5,142,278 | 8/1992 | Moallemi et al. | 340/825.06 |
| 5,397,924 | 3/1995 | Gee et al. | |
| 5,488,352 | 1/1996 | Jasper | 340/431 |
| 5,729,058 | 3/1998 | Groeller | 307/10.1 |
| 5,739,592 | 4/1998 | Rigsby et al. | |
| 5,920,128 | 7/1999 | Hines | 307/9.1 |

*Primary Examiner*—Albert W. Paladini
*Attorney, Agent, or Firm*—Christensen O'Connor Johnson & Kindness PLLC

[57] ABSTRACT

An electrical interface for connecting a truck electrical system to a trailer electrical system. The electrical interface includes a solid-state switching device for selectively connecting a power source in the truck electrical system to a circuit in the trailer electrical system. If a fault is detected in the provision of power to the circuit in the trailer electrical system, the solid-state switching device reduces the flow of power or disconnects the power source from the circuit in the trailer electrical system. A microcontroller system connected to the truck electrical system transmits control signals to the solid-state switching device to control the flow of power from the power source to the circuit in the trailer electrical system in accordance with instruction signals received from the truck electrical system. The solid-state switching device includes a transistor switch connected between the power source and the circuit in the trailer electrical system and a transistor driver circuit connected to the microcontroller system to control the operation of the transistor switch. The microcontroller system includes a processor and a transceiver that conveys data transmitted between the processor and the truck electrical system. The electrical interface may also include a daughter board connector for connecting an external circuit, such as a communications circuit, to the electrical interface that enables the processor to communicate data with the circuit in the trailer electrical system using an existing electrical connection to an output of the electrical interface.

26 Claims, 10 Drawing Sheets

ELECTRONIC INTERFACE AND METHOD FOR CONNECTING THE ELECTRICAL SYSTEMS OF A TRUCK AND TRAILER

FIELD OF THE INVENTION

The present invention relates generally to the connection of electrical systems in a heavy truck and trailer, and more particularly to an electrical interface between a heavy truck and trailer.

BACKGROUND OF THE INVENTION

Heavy trucks and trailers have been used for many years to transport goods from one location to another. When a truck delivers a trailer to its destination, the truck may be separated from the trailer so that the truck can be coupled to another trailer for transporting the goods contained therein to another location.

A trailer coupled to a truck receives electrical power from the truck to operate various electrical circuits in the trailer. Such electrical circuits include trailer lamps, stop/brake lamps, and turn signal lamps. The electrical circuits on a trailer are typically wired to a connector that mates with a connector wired through a truck/trailer electrical interface to the electrical systems of the truck. A standard connector in this regard for the heavy truck and trailer industry is an SAE J560 connector.

Present-day wiring for a truck/trailer electrical interface includes high-power relays, fuses, circuit breakers, and numerous electrical interconnects. A number of problems exist with the present method of interfacing a truck's electrical systems to a trailer. One problem is that the fuses and circuit breakers are typically not designed to provide protection for specific circuits. Moreover, in some circumstances, the fuses and circuit breakers trip at current levels far in excess of the nominal current rating of the wiring. Circuit breakers can also fail in ways that lead to a wiring failure. If these devices fail in a shorted mode, they no longer protect the truck wiring from excess current levels. Furthermore, present-day wiring of a truck/trailer electrical interface provides no protection from after-market suppliers connecting additional circuitry to one or more trailer circuits and drawing an excessive amount of power from the truck, leading to electrical overloading of the truck/trailer wiring.

In addition to providing power to trailer lamps, stop/brake lamps, and turn signal lamps, a truck also typically provides power to an auxiliary power circuit in the trailer. At the present time, heavy electrical loads connected to a trailer's auxiliary power circuit may encounter a low-voltage situation in which the available voltage in the auxiliary power circuit is insufficient to operate the connected loads. The low-voltage situation results from the high amount of circuit resistance in the wiring of a present-day truck/trailer electrical interface. As a trailer draws an increasing amount of current through the truck/trailer electrical interface, the voltage drop across the electrical interface also increases.

For example, a typical truck/trailer electrical interface in the heavy truck industry may include a fuse having a cold resistance of 0.002 ohms, 25 feet of #10 GXL wiring having a resistance of 0.115 ohms, a 30-amp circuit breaker having a cold resistance of 0.21 ohms and relay contacts having a resistance of 0.2 ohms, resulting in a total interface resistance of 0.527 ohms. As shown in Table 1 below, when a trailer circuit draws 5 amps of current through the electrical interface, the voltage drop across the interface is 2.64 volts, leaving 11.16 volts available to the trailer circuit (given that the battery voltage of a truck battery is nominally 13.8 volts when the battery is in a charged state). If the trailer circuit were to draw 9 amps through the electrical interface, the voltage drop across the interface would be 4.74 volts, leaving 9.06 volts available to the trailer circuit. Should the trailer circuit attempt to draw a full-rated load of 30 amps, by Ohms law the voltage drop across the interface should be 15.81 volts, which is impossible because it exceeds the total voltage of the battery. Even an available voltage level of 9.06 volts (at 9 amps) is unacceptable for certain trailer systems that require a minimum voltage of 9.5 volts (e.g., a trailer ABS system that per TMC RP144 requires a minimum 9.5 volts at the ABS unit).

TABLE 1

| Current | Battery Voltage | Drop Across Present Interface | Voltage Available to Trailer |
|---|---|---|---|
| 5 amps | 13.8 volts | 2.64 volts | 11.16 volts |
| 9 amps | 13.8 volts | 4.74 volts | 9.06 volts |
| 30 amps | 13.8 volts | 15.81 volts | — |

While trailers of today may not require high amounts of current such as 30 amps, many trailers require about 5 amps for the turn signal lamps, 10 amps for the trailer clearance and marker lamps, and 12 amps for the auxiliary power circuit. In any event, the voltage available to trailer circuits through present interface designs has been shown to be marginal. See, for example, studies performed for trailer ABS systems as reported by the Department of Transportation in DOT HS 808 076 (October 1993). In the future, trailers are anticipated to include circuitry for monitoring loads, weights, and performance that will require additional electrical power. The existing interface wiring methods are not able to meet the increased need for electrical power.

Furthermore, a conventional truck/trailer electrical interface does not provide means for data communication between the truck and a trailer. Federal laws are soon to require that trailer ABS system faults be reported to the driver. Additionally, cargo, weight, tire and brake wear system providers are also looking for ways to communicate status information from a trailer to a driver in the truck. The present invention provides solutions for these needs as well as addresses other shortcomings in the prior art.

SUMMARY OF THE INVENTION

The present invention is a system and method for interfacing the electrical system of a truck with the electrical system of a trailer. A truck/trailer electrical interface constructed according to the invention includes a solid-state switching device for selectively connecting a power source in the truck electrical system to a circuit in the trailer electrical system. If a fault, such as a short circuit condition, is detected in the provision of power to the circuit in the trailer electrical system, the truck/trailer electrical interface reduces the flow of power or disconnects the power source from the circuit in the trailer electrical system.

In one aspect of the invention, a microcontroller system that is electrically connected to the truck electrical system controls the solid-state switching device. The microcontroller system receives instruction signals from the truck electrical system and transmits control signals to the solid-state switching device to control the flow of power in accordance with the instruction signals received. A fault detected in the provision of power to the circuit in the trailer electrical system is communicated to the microcontroller system which in turn reports the detected fault to the truck electrical system. In addition to the solid-state switching device reducing the flow of power or disconnecting the power source in the event of a fault, the microcontroller system may also send a control signal to further disable the solid-state switching device from connecting the power source to the circuit in the trailer electrical system.

The solid-state switching device includes a transistor driver circuit that receives the control signals from the microcontroller system and selectively enables a transistor switch to conduct power from the power source to the circuit in the trailer electrical system in accordance with the control signals received. The transistor driver circuit monitors the flow of power to the circuit in the trailer electrical system and disables the transistor switch from conducting power if a fault, such as a short circuit condition, is detected.

The microcontroller system includes a processor electrically connected to the truck electrical system and the solid-state switching device. The processor generates and transmits the control signals to the solid-state switching device. A protected power conversion circuit provides a regulated power supply to the solid-state switching device and the microcontroller system.

In another aspect of the invention, the microcontroller system includes a daughter board connector for electrically connecting an external circuit to the truck/trailer electrical interface. The daughter board connector provides an electrical connection to the processor and to an output of the truck/trailer electrical interface through which power flows to a circuit in the trailer electrical system. The daughter board connector is configured to receive, for example, an external communications circuit that enables the processor to communicate data with the circuit in the trailer electrical system using the electrical connection of the daughter board connector to the output of the truck/trailer electrical interface.

In still another aspect of the invention, the truck/trailer electrical interface is capable of exchanging data with the truck electrical system via a data bus. A transceiver connected to the processor and the data bus conveys the data transmitted between the processor and the truck electrical system. If a collision of data transmitted on the data bus occurs, the processor is configured to interrupt the transmission of data and to retransmit the data after expiration of a period of time to avoid further data collisions on the data bus.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
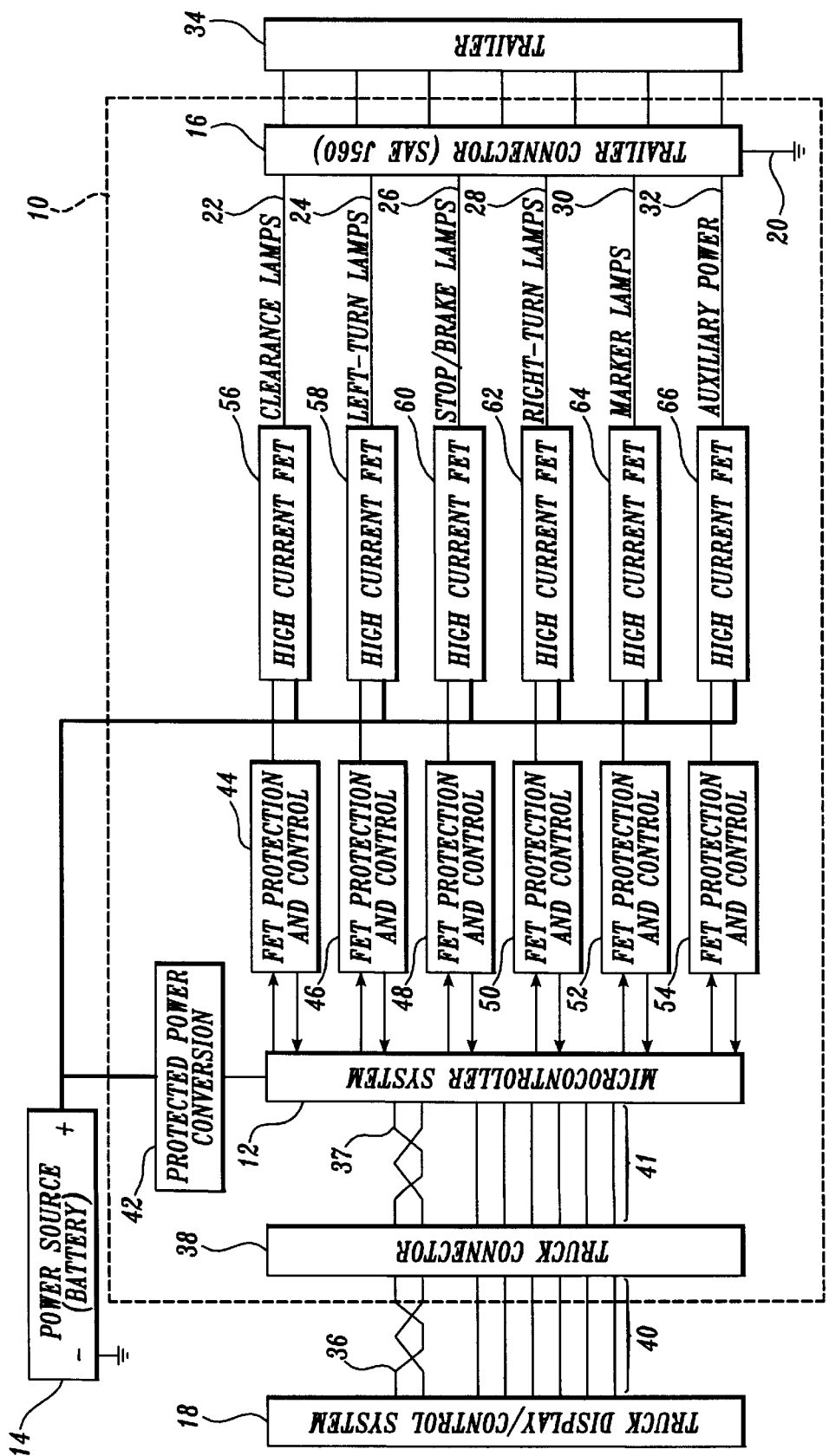
FIG. 1 is a block diagram of a truck/trailer electrical interface constructed in accordance with the present invention that electrically connects a truck with a trailer to control the flow of electrical power from a power source in the truck to circuits in the trailer.

FIG. 1 is a block diagram that illustrates one embodiment of a solid-state truck/trailer electrical interface 10 constructed in accordance with the present invention. Central to the operation of the electrical interface 10 is a microcontroller system 12 that controls the flow of electrical power from a power source 14 (e.g., truck battery) to one or more pins on a trailer connector 16 in response to signals received from a truck display/control system 18.

In a preferred embodiment of the invention, the trailer connector 16 is a 7-pin SAE J560 connector. One pin of the J560 connector is connected to ground via line 20. The other six pins of the J560 connector are connected to high-current field-effect transistors (FETs) 56, 58, 60, 62, 64, and 66 via lines 22, 24, 26, 28, 30, and 32 to provide an electrical connection to the following respective circuits in the trailer 34: clearance lamps, left-turn signal lamps, stop/brake lamps, right-turn signal lamps, marker lamps, and auxiliary power circuit.

The truck display/control system 18 includes the various switches and devices used by an operator of the truck or on-board computer system to activate circuits such as the left- and right-turn signals circuits. The truck display/control system also includes lights, dials, gauges, and other output devices that communicate information to the operator of the truck.

Trucks manufactured in more recent years have a digital data communication system in the truck display/control system 18. The truck/trailer electrical interface 10 is preferably connected to the digital data communication system via a data link 36. The data link 36 is configured in accordance with the protocols that govern the digital data communication system (e.g., SAE J1939 or SAE J1708/1587 developed by the Society of Automotive Engineers). A truck connector 38 connects the data link 36 to the microcontroller system 12 of the electrical interface 10 through a corresponding data link 37. In trucks that do not have a digital data communication system as described, the truck connector 38 preferably connects individual signal lines 40 from the truck display/control system 18 with corresponding individual signal lines 41 to provide instruction signals to the microcontroller system 12 indicating when to turn on the turn signals, trailer lamps, auxiliary power, etc.

The power source 14 provides electrical power to the microcontroller system 12 through a protected power conversion circuit 42. The power conversion circuit 42 converts the voltage of the power source 14 (nominally 13.8 volts DC for a truck battery) to a 5-volt DC logic power that is then supplied to the microcontroller system 12 and to one or more FET protection and control circuits 44, 46, 48, 50, 52, and 54 described in more detail below. In addition to providing a 5-volt DC logic power, the power conversion circuit 42 protects the microcontroller system 12 and the FET protection and control circuits from voltage spikes, transitions, and noise.

Figure 2:
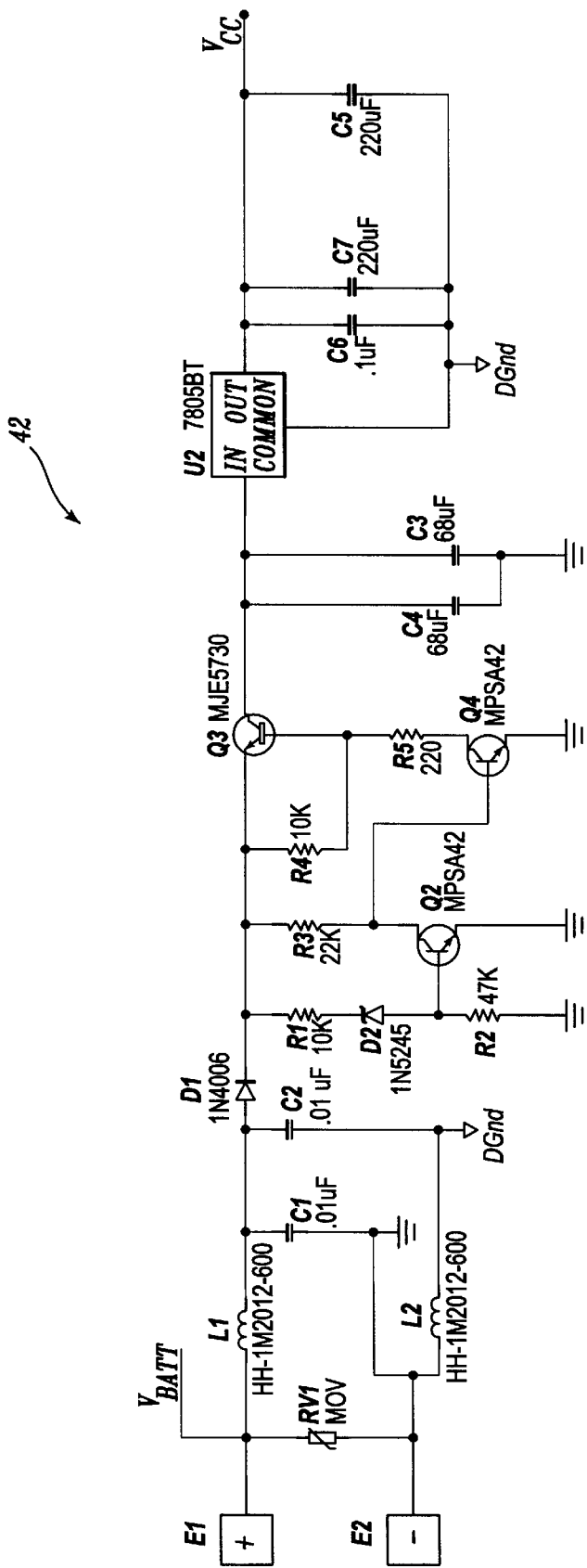
FIG. 2 is a schematic drawing of a protected power conversion circuit shown in the truck/trailer electrical interface illustrated in FIG. 1 that provides logic power to a microcontroller system and field-effect transistor (FET) protection and control circuits in the truck/trailer electrical interface.

FIG. 2 is a schematic drawing of a protected power conversion circuit 42 that is used in one embodiment of the present invention. In FIG. 2, connectors E1 and E2 are electrically connected to the positive and negative terminals of the power source 14. A transient voltage surge suppressor RV1 connected between the connectors E1 and E2 provides protection from voltage surges and spikes from the power source. In one actual embodiment of the invention, the surge suppressor RV1 is a radial lead metal-oxide varistor manufactured by Harris Semiconductor of Melbourne, Fla. (specifically, part No. 24ZA50) that is designed for use in protecting low- and medium-voltage circuits and systems. When the input voltage level on the positive connector E1 surges above 18 volts, the surge suppressor RV1 conducts the flow of current to the negative connector E2.

The power conversion circuit 42 includes a diode D1 to protect the circuit from reverse polarity of the inputs of the power source 14. The power conversion circuit 42 also includes an inductor L1 and capacitors C1 and C2 to filter higher frequency noise on the voltage input from the power source 14.

Under normal operating conditions where the input voltage from the power source 14 is less than 18 volts, diode D2 does not conduct current which leaves the transistor Q2 in an off state (i.e., not conducting current). When the transistor Q2 is in an off state, transistor Q4 is biased to turn on (i.e., conduct current) which then provides a proper base voltage to transistor Q3 in order to turn transistor Q3 on. When transistor Q3 is on, current flows through transistor Q3 to a voltage regulator circuit U2. In this manner, transistor Q3 acts as a switch that turns the power conversion circuit 42 on and off.

The diode D2 is a zener diode that conducts current through resistor R2 to ground when the input voltage exceeds 18 volts. The voltage drop across resistor R2 biases the base of transistor Q2 and turns transistor Q2 on. When transistor Q2 is turned on, the collector of transistor Q2 has a near-ground level voltage which turns off transistor Q4 and in turn turns off transistor Q3, thus shutting off the power conversion circuit 42 and protecting the power conversion circuit 42 from excessive voltage conditions.

As noted, when transistor Q3 is on, the input voltage is provided to a voltage regulator circuit U2. In one actual embodiment of the invention, the voltage regulator circuit U2 is a TL780 series positive-voltage regulator (specifically part No. TL78005) manufactured by Texas Instruments of Dallas, Tex. The output of the voltage regulator circuit U2 is a 5-volt logic power $V_{cc}$ used throughout the electrical interface 10. The capacitors C5, C6, and C7 on the output of the voltage regulator circuit U2 filter out small fluctuations in the output voltage.

Figure 3A:
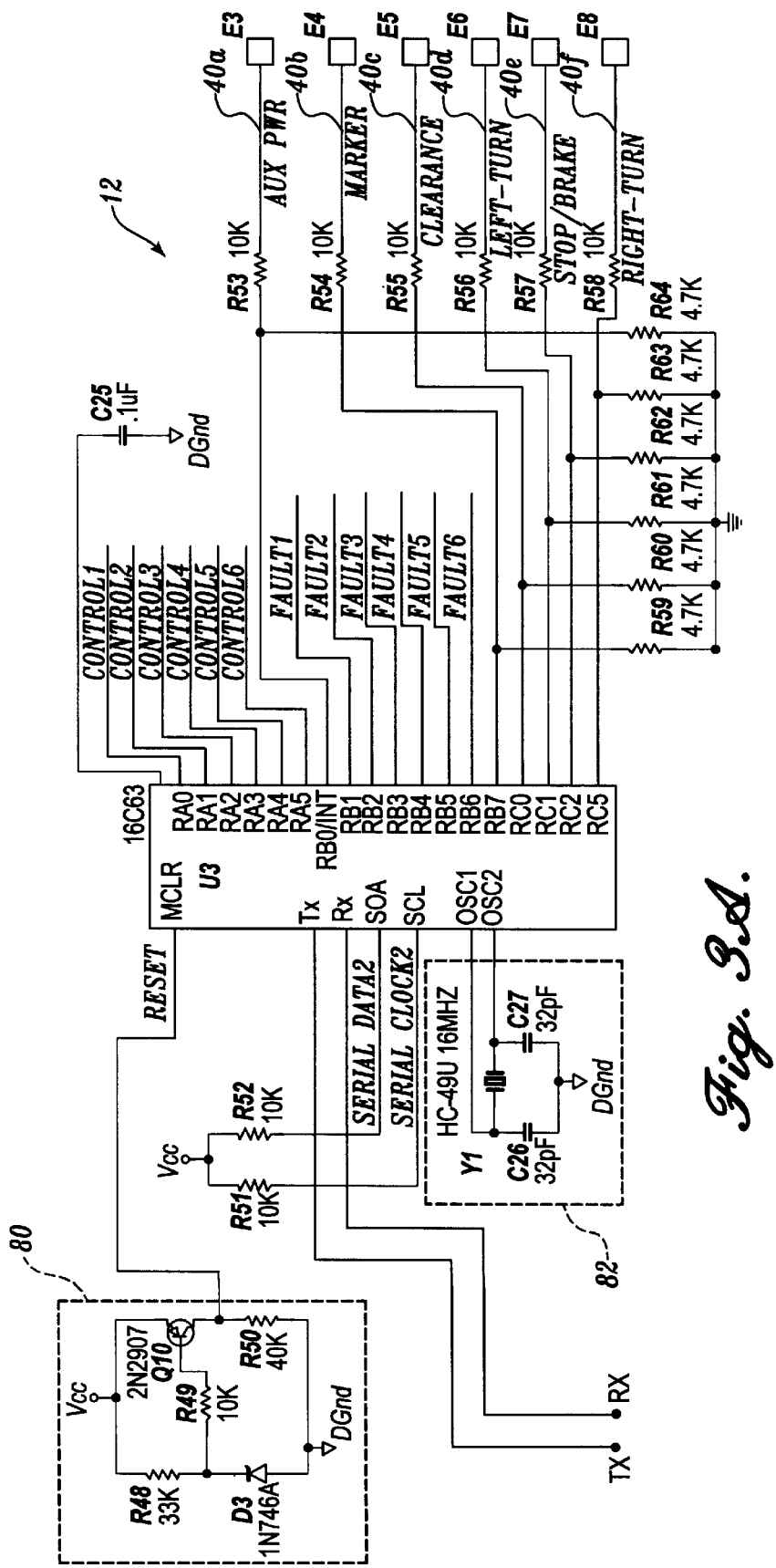
FIG. 3A is a schematic drawing of a first portion of a microcontroller system shown in the truck/trailer electrical interface illustrated in FIG. 1 that includes a processor and related inputs and outputs.
Figure 3B:
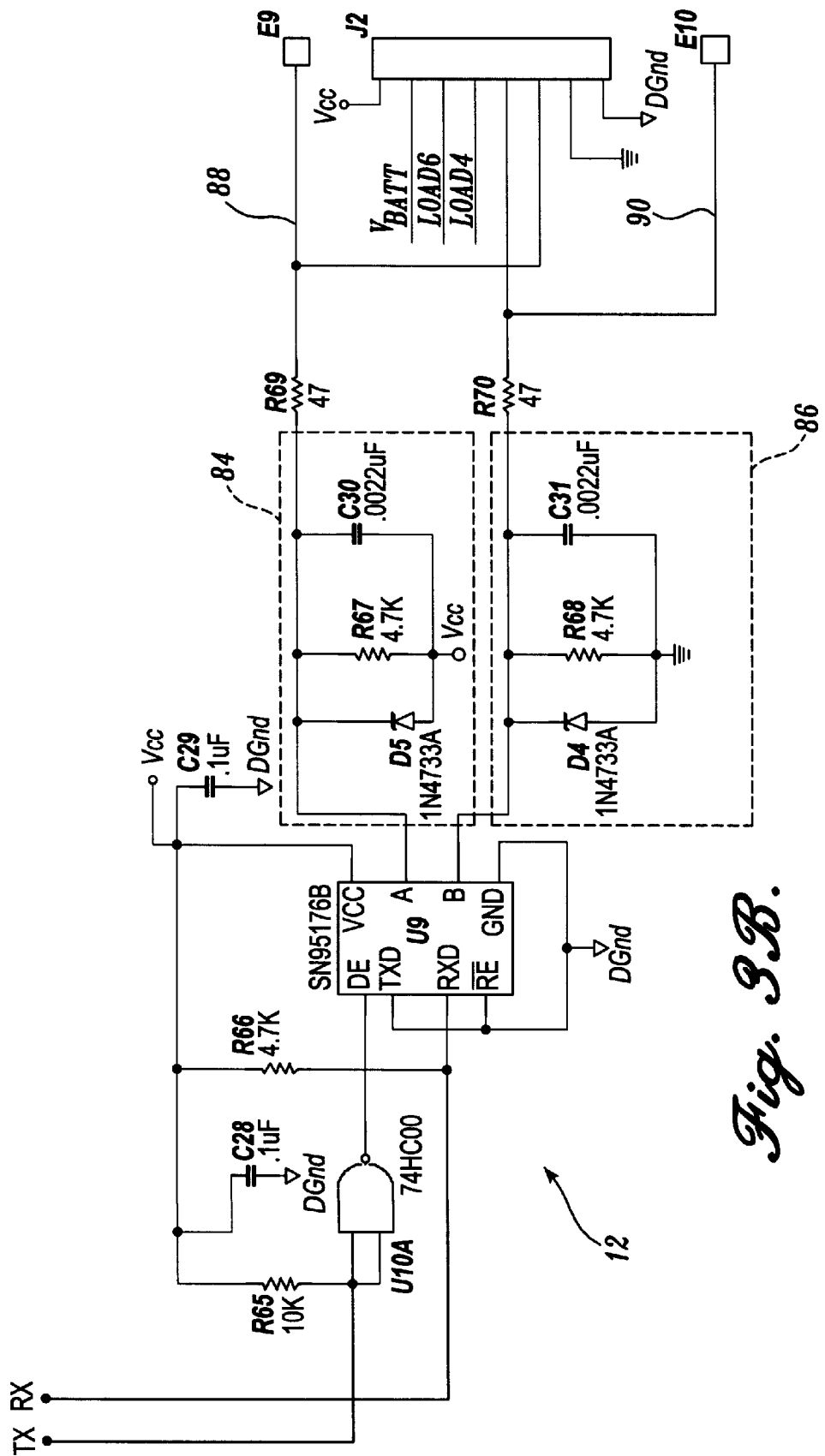
FIG. 3B is a schematic drawing of a second portion of the microcontroller system shown in the truck/trailer electrical interface illustrated in FIG. 1 that includes components providing data communication between the processor shown in FIG. 3A and the truck display/control system shown in FIG. 1, and a daughter board connector for connecting external circuitry to the truck/trailer electrical interface.

The microcontroller system 12, an embodiment of which is described in more detail below in reference to FIGS. 3A and 3B, receives instruction signals from the truck display/control system 18 by way of the data link 37 and/or individual signal lines 41 as shown in FIG. 1. FIG. 3A is a schematic drawing of a first portion of the microcontroller system 12 showing the microcontroller aspect of the microcontroller system 12. FIG. 3B is a schematic drawing of a second portion of the microcontroller system 12 showing the data communication aspect of the microcontroller system 12. According to instruction signals received from the truck display/control system 18, the microcontroller system 12 sends control signals to one or more FET protection and control circuits 44, 46, 48, 50, 52, and 54 to permit or interrupt the flow of current from the power source 14 through high-current FETs 56, 58, 60, 62, 64, and 66 to the trailer connector 16. The FET protection and control circuits 44, 46, 48, 50, 52, and 54, and the corresponding high-current FETs 56, 58, 60, 62, 64, and 66, are described in more detail below in reference to FIGS. 4–9.

Turning now to FIG. 3A, the microcontroller system 12 includes a processor U3 that controls the operation of the microcontroller system 12. The processor U3 has a number of inputs and outputs. For data communication via the data link 37, transmit line TX is connected to the output pin Tx of the processor U3, and receiver line RX is connected to the input pin Rx of the processor U3. Other input pins on the processor U3 are connected to connectors E3–E8 through lines 40*a*–40*f*. The connectors E3–E8 are connected to the optional individual signal lines 41 (FIG. 1) that are provided in trucks that do not have a data link 37.

Control lines labeled Control1-Control6 convey control signals from output pins on the processor U3 to the FET protection and control circuits 44, 46, 48, 50, 52, and 54 to indicate when to turn on and off the corresponding high-current FETs 56, 58, 60, 62, 64, and 66. As will be better understood from the discussion below regarding the FET protection and control circuits 44, 46, 48, 50, 52, and 54, faults detected in providing power to the trailer 34 are reported to the processor U3 through lines Fault1-Fault6. The processor U3 may then forward information regarding the detected faults to the truck display/control system 18 via the data link 37 that is connected to connectors E9 and E10 shown in FIG. 3B.

A reset circuit 80 and an oscillator circuit 82 shown in FIG. 3A are connected to the processor U3. The line labeled RESET is held low by the reset circuit 80 until $V_{cc}$ equals or exceeds 4.3 volts. A $V_{cc}$ voltage that exceeds 4.3 volts causes diode D3 in the reset circuit 80 to conduct current to ground (DGnd), thereby turning on transistor Q10 and causing a valid reset of the processor U3. The oscillator circuit 82 provides a clock signal to the processor U3. Furthermore, input pins on the processor U3 connected to the unused lines labeled Serial Data2 and Serial Clock2 are tied to $V_{cc}$.

In one actual embodiment of the invention, the processor U3 is an eight-bit CMOS microcontroller (specifically, part No. PIC16C63) manufactured by Microchip Technology, Inc. of Phoenix, Ariz. The processor U3 operates in accordance with the present invention by executing computer program instructions stored in an integrated memory in the processor U3. In alternative embodiments of the invention, however, the processor chosen as processor U3 may execute computer program instructions stored in an external memory, such as a RAM, ROM, hard drive, or other storage medium. The processor U3 evaluates the input signals from the truck display/control system 18 received via the data links 36 and 37, or the individual input lines 40 and 41, to determine whether an instruction signal has been received. If, for example, an instruction signal to turn on the left-turn signal has been received, the processor U3 sends a control signal on one of the control lines Control1–Control6 to the appropriate FET protection and control circuit that controls the flow of power to the left-turn signal lamps in the trailer.

The second portion of the microcontroller system 12 shown in FIG. 3B includes a transceiver U9 that interfaces the communication of data between the processor U3 and the data link 37 (connected to connectors E9 and E10). In particular, the transceiver U9 drives bus lines 88 and 90 over which the data is communicated. In FIG. 3B, the transceiver U9 is a differential bus transceiver, although many alternative types of transceivers may be used in the present invention.

A receive line RX is connected between the Rx pin on the processor U3 and the RXD output pin on the differential bus transceiver U9. For reasons discussed in further detail below, the transmit line TX connected to the Tx pin on the processor U3 is not directly connected to the TXD input pin on the differential bus transceiver U9 but instead is connected through a nand gate U10A (operating as an inverter) to the transmit enable pin DE on the differential bus transceiver U9.

The differential input/output (I/O) pins A and B on the differential bus transceiver U9 are connected to connectors E9 and E10 via bus lines 88 and 90, respectively. The connectors E9 and E10 are electrically connected through the truck connector 38 to the data link 36 when the electrical interface 10 is installed in a truck. In one actual embodiment of the present invention, the differential bus transceiver U9 is a differential bus transceiver manufactured by Texas Instruments of Dallas, Tex. (specifically, part No. SN65176B), that is designed for bi-directional data communication on multi-point bus transmission lines.

To understand the operation of the differential bus transceiver U9 as implemented in FIG. 3B, it is first necessary to understand the protocol that preferably governs the data link 37. Preferably, the physical layer of the data link 37 (and data link 36) is a serial bus that operates according to the protocol SAE J1708, as set forth by the Society of Automotive Engineers. Data communicated on an SAE J1708 data link is preferably transmitted in accordance with SAE 1587 data transmission protocol.

According to SAE J1708, a device connected to the bus desiring to transmit a "1" (high signal) must drive the high signal on the bus recessively. Driving a high signal recessively means that the bus carries a high signal only if there are no other devices connected to the bus transmitting a "0" (low signal). In contrast, a device transmitting a "0" in accordance with SAE J1708 transmits a low signal on the bus in a dominant fashion, meaning that the bus is put in a low state regardless of other devices recessively driving a high signal on the bus.

The connection of the differential bus transceiver U9 to the processor U3 as shown in FIGS. 3A and 3B enables the processor U3 to communicate data in accordance with SAE J1708. For example, when the processor U3 transmits a "0" (low signal) on the transmit line TX, the differential bus transceiver U9 actively drives a "0" on the bus (i.e., in a dominant fashion). The differential bus transceiver U9 identified above as being used in an actual embodiment of the invention drives a "0" on the bus (i.e., a low signal on the I/O pin A and a high signal on I/O pin B) when a low signal is present on input pin TXD and a high signal is present on transmit enable pin DE. In FIG. 3B, the input pin TXD of transceiver U9 is held continuously in a low state (e.g., tied to ground). Accordingly, when the processor U3 transmits a "0" (low signal) on transmit line TX (which is inverted by the nand gate U10A to be a high signal on the transmit enable pin DE of the transceiver U9), the differential bus transceiver U9 drives a "0" on the data bus physical layer.

When the processor U3 transmits a "1" (high signal) on the transmit line TX, the high signal is inverted by the nand gate U10A to become a low signal. The differential bus transceiver U9 interprets a low signal on the transmit enable pin DE as instructing the transceiver U9 to isolate itself from the bus. Thus, with a low signal on the transmit enable pin DE, the differential bus transceiver U9 places the I/O pins A and B in a high impedance state, effectively isolating the differential bus transceiver U9 from the bus lines 88 and 90.

Isolating the differential bus transceiver U9 from the bus permits a pull-up circuit 84 connected to line 88 of the bus (i.e., the line tied to the I/O pin A of the transceiver U9), and a pull-down circuit 86 connected to line 90 of the bus (i.e., the line tied to the I/O pin B of the transceiver U9) to recessively produce a high state on the bus. The pull-up circuit 84 is tied to the $V_{cc}$ while the pull-down circuit 86 is connected to ground. The pull-up circuit 84 and the pull-down circuit 86 produce a weak high state that is present on the bus unless another device connected to the bus actively drives a "0" (low state) on the bus. As noted earlier, a low state driven on the bus dominates over any recessive high state on the bus. A summary of the operation of the differential bus transceiver U9 in transmitting data is provided below in Table 2. It should be understood that this discussion of the transmitter mode of operation is specific to the transceiver U9 used in an actual embodiment of the invention. Alternative transceivers that are suitable for use in the present invention may provide the data input and output in a different manner.

TABLE 2

| Transmit Line TX | Transceiver I/O Pin A | Transceiver I/O Pin B | Data State On Bus |
| --- | --- | --- | --- |
| Low | Low | High | Dominant |
| High | High Impedance (Weak High on Bus) | High Impedance (Weak Low on Bus) | Recessive |

In a receiver mode of operation, the differential bus transceiver U9 outputs a high or low signal on the receive line RX depending on the voltage levels present on the I/O pins A and B. If, for instance, a high signal is present on I/O pin A and a low signal is present on I/O pin B (albeit a recessive "weak" high signal on the bus), the differential bus transceiver U9 outputs a high signal on receive line RX to the Rx pin on the processor U3. On the other hand, if a low signal is present on I/O pin A and a high signal is present on I/O pin B, the differential bus transceiver U9 outputs a low signal on the receive line RX.

Under the SAE J1587 data transmission protocol, data is transmitted on the bus asynchronously. Because many devices may be connected to the bus, arbitration of communication on the bus is necessary to make sure that one device is not transmitting at the same time that another device is transmitting. The processor U3 performs data communication arbitration for the electrical interface 10 by monitoring the signal present on the receive pin Rx when transmitting data on the transmit pin Tx. Due to the configuration of the differential bus transceiver U9 as described above, when the bus is not busy with data transmissions from other devices, the signal on the receive line RX matches the data signal being transmitted by the processor U3 on the transmit line TX. Thus, as long as the processor U3 observes a high signal on the Rx pin when transmitting a high signal on the transmit pin Tx, the processor U3 assumes that the bus is not busy and continues to send data. Note that the processor U3 may only assume that the data link is not busy because it may be that at that moment another device on the bus is also transmitting a high signal on the bus.

A data collision is detected when another device on the bus drives a low signal on the bus at the same time that the processor U3 transmits a high signal. In that event, the receive pin Rx on the processor U3 will receive the low signal from the other device since the receiver mode of the transceiver U9 is always enabled (i.e., the active-low receive enable pin RE is tied to ground) and the transmission of a low signal is dominant. The processor U3 observes the disparity between the signals on the transmit pin Tx and receive pin Rx and recognizes that a data collision has occurred. At that point, the processor U3 stops transmitting data and waits for a specified period of time. The processor U3 then attempts again to send the data. It is anticipated that in this manner the processor U3 will avoid transmitting data at the same time as other devices on the bus.

FIG. 3B also illustrates a daughter board connector J2 that allows other external circuits to be connected to the truck/trailer electrical interface 10. For example, a power line carrier communications circuit may be plugged into the daughter board connector J2 to enhance the communication of information between the truck display/control system 18 and the trailer 34. As shown in FIG. 3B, the daughter board connector J2 includes a connection to the line $V_{batt}$ as well as $V_{cc}$, ground, and DGnd. While $V_{cc}$ and $V_{batt}$ provide power to the circuit plugged into the daughter board J2, the ground and DGnd connections provide a ground to the circuit. The daughter board connector J2 also includes connections to lines labeled Load4 and Load6 described in more detail below in reference to FIGS. 7 and 9, respectively. The lines Load4 and Load6 provide the external circuit plugged into the daughter board connector J2 with electrical access to the right-turn signal circuit and the auxiliary power circuit in the trailer 34.

A power line carrier method of communication uses a modulated data signal that is transmitted on top of a line of power in an existing electrical connection. For instance, using the line Load6 (connected to the auxiliary power circuit), a power line carrier communications circuit plugged into the daughter board connector J2 may modulate a data signal and add it to the steady state DC power being provided by the power source 14 to the auxiliary power circuit in the trailer 34. Likewise, circuits in the trailer 34 adapted for power line carrier communication may transmit data signals back to the power line carrier communications circuit in the daughter board connector J2 via the connection of line Load6 to the daughter board connector J2. In addition or as an alternative to transmitting data via the auxiliary power circuit, data may be transmitted via the right-turn signal circuit through the connection of the line Load4 to the daughter board connector J2. Other connections to the trailer 34 (e.g., through lines Load1, Load2, Load3, or Load5 shown in FIGS. 4, 5, 6, and 8) may be used instead of connected to the daughter board connector J2. Techniques for transmitting data signals on top of a line of power are well-known in the art of data communication.

If the power line carrier communications circuit plugged into the daughter board connector J2 receives data from the trailer 34, the power line carrier communications circuit may transmit the data to the truck display/control system 18 via the data link 37 (connected to the data link 36). For that reason, the daughter board connector J2 also provides a connection to the connectors E9 and E10. If necessary, the power line carrier communications circuit may reformat the data received over the power line (e.g., lines Load4 or Load6) in accordance with the data transmission protocol of the data link 37 (e.g., SAE 1587 protocol).

Another communications circuit that may be plugged into the daughter board connector J2 may provide circuitry for converting data communicated via the data link 36 to another type of data transmission protocol for communication via data link 37. In that manner, if the data link 36 is a higher speed serial data bus that uses SAE J1939 data transmission protocol, for example, while the data link 37 uses SAE 1587 data transmission protocol, the communications circuit in the daughter board connector J2 may act as an interpreter between the two data links.

The truck connector 38 illustrated in FIG. 1 is preferably a sealed connector that seals the connector pins from the external environment. Water and dust in external environment are thus prevented from damaging the pins or affecting the electrical communication through the truck connector 38. Furthermore, the truck connector 38 preferably uses a bulkhead mount that allows the connector to be mounted to the face of the housing that encloses the electrical interface 10. Regardless, the truck connector 38 may be any type of connector that uses any type of mounting means.

FIGS. 4–9 are schematic drawings that illustrate one embodiment of the FET protection and control circuits 44, 46, 48, 50, 52, and 54. FIGS. 4–9 also illustrate the connection of the high-current FETs 56, 58, 60, 62, 64, and 66 to the respective FET protection and control circuits. As noted earlier in reference to FIG. 1, the FET protection and control circuits permit or interrupt the flow of current from the power source 14 to the trailer connector 16 as instructed by the microcontroller system 12.

Figure 4:
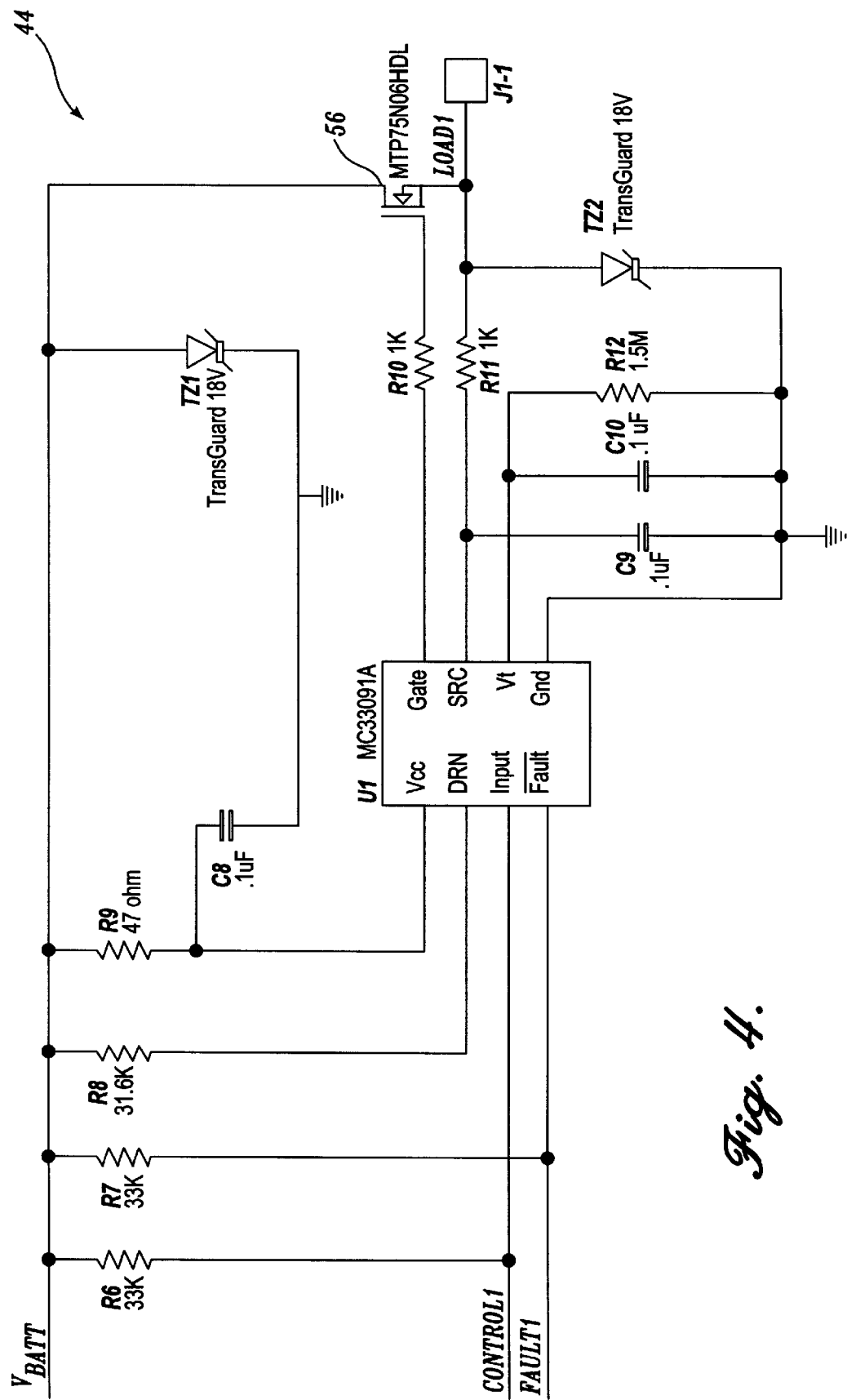
FIG. 4 is a schematic drawing of a FET protection and control circuit and high-power FET shown in the truck/trailer electrical interface illustrated in FIG. 1 that control the flow of electrical power from the power source to the clearance lamps in the trailer.

Referring now to FIG. 4, the FET protection and control circuit 44 includes a FET driver circuit U1 that controls the operation of the high-current FET 56. Depending on the control signal received from the processor U3 (i.e., the signal on the line labeled Control1), the FET driver circuit U1 places the high-current FET 56 in a conducting or non-conducting state. As shown in FIG. 1, the FET protection and control circuit 44 controls the flow of current to the clearance lamps of the trailer 34. Accordingly, when the processor U3 sends an appropriate signal (e.g., a high signal) on the line Control1, the FET driver circuit U1 outputs a voltage on the gate of the high-current FET 56 sufficient to cause the FET 56 to permit current to flow through the FET 56 to the trailer 34. When the high-current FET 56 is turned "on" in this fashion, electrical power on the line $V_{batt}$ is provided to an output connector J1-1. The output connector J1-1 is connected to the appropriate pin on the trailer connector 16 that leads to the clearance lamps of the trailer 34.

In one actual embodiment of the invention, the FET driver circuit U1 is a high-side TMOS driver (specifically, part No. MC33091A) manufactured by Motorola, Inc. of Schaumburg, Ill. designed for use in harsh automotive switching applications. The high-current FET 56 driven by the FET driver circuit U1 is a high density power FET also manufactured by Motorola, Inc. (specifically, part No. MTP75N06HD). While the above identified high-side TMOS driver and high density power FET are used in an actual embodiment of the present invention, those with ordinary skill in the art of electronics will recognize that many other FET drivers and FETs manufactured by other entities may also be used in the invention. Furthermore, those with ordinary skill in the art of electronics will also recognize that other types of transistors other than high-current FETs may be used in the invention, along with other types of transistor driver circuits.

When the processor U3 instructs the FET driver circuit U1 to turn on its associated high-current FET 56 (i.e., to conduct current to the clearance lamps in the trailer 34), the FET driver circuit U1 monitors the current drawn through the FET to ensure that the amount of current being drawn is within an acceptable range. If, for example, the clearance lamp circuit experiences a shorted condition and begins to draw an excessive amount of current through the FET 56, the FET driver circuit U1 automatically turns off the FET 56, thereby cutting off the flow of current to the clearance lamps.

More specifically, the FET driver circuit U1 monitors the voltage drop across the high-current FET 56. The internal resistance of the FET 56 develops a very small voltage. This voltage increases as the current flowing through the FET 56 rises. The FET driver circuit U1 attempts to maintain an internal reference voltage equal to the voltage drop across the FET 56 by increasing a current output by the FET driver circuit U1 through resistor R8. The internal circuits of the FET driver circuit U1 monitor this internal reference voltage. In an overload condition (i.e., excessive current flowing through the FET 56), the FET driver circuit U1 will not be able to output a current through resistor R8 to match the internal reference voltage to the voltage across the FET 56. In one actual embodiment of the invention, an overload condition is detected when the current flowing through the FET 56 exceeds 25 amps at 85° C. (or 30 amps at ambient temperature), due to the selection of 31.6 k ohms for resistor R8. Other resistor values for R8 may be used to select other levels of current to trigger an overload condition.

If an overload condition is detected, the FET driver circuit U1 begins to duty cycle the FET 56 by turning it off and on to limit the average amount of current flowing into the clearance lamp circuit. If the clearance lamp circuit is completely shorted, the FET driver circuit U1 will detect a near ground voltage on the output J1-1 and turn off the FET 56. The parallel network of resistor R12 and capacitor C10 provides a delayed shut off response which allows devices such as incandescent lamps and inductive loads in the trailer to turn on with high in-rush currents during a turn-on condition. Resistor R10 provides some isolation between the gate of the FET 56 and the gate control output of the FET driver circuit U1.

Alternative techniques may be used to protect the FET 56 from overheating and/or failing due to excessive current flow. For example, certain integrated circuit manufactures (e.g., Siemens) manufacture "SmartFETs" that monitor the heat of their internal FETs and shut them off if the internal FET temperature becomes too high. At present these devices do not switch high load currents of 25 to 30 amps. However, when SmartFETs are developed to handle larger currents, they may be considered for use in the present invention. Current flow may also be measured using "Hall Effect" devices as well as magnetoresistive technologies.

The FET driver circuit U1 includes an active-low fault pin that reports faults, such as a short or overload condition, detected on the output connector J1-1 to the processor U3 via the line labeled Fault1. When a fault is indicated on line Fault1, the processor U3 sends a control signal to the FET driver circuit U1 to turn off the FET 56 as a redundant measure to further isolate the faulty clearance lamp circuit. The processor U3 unit communicates the fault condition as diagnostic information to the truck display/control system 18 via the data link 37 and data link 36 (e.g., to notify the operator of the truck of the fault condition).

In other embodiments of the invention, fault detection and control may be handled by the processor U3 instead of the FET driver circuit U1. In that regard, a device for measuring the flow of power (or an aspect of power, e.g., a current sensor for sensing current) may be connected to the output connector J1-1. The current sensor would provide the processor U3 with information indicative of the amount of current flowing through the output connector J1-1 . If the processor U3 determines that the current flow has become excessive (i.e., indicating a short or overload condition), the processor U3 would send an appropriate control signal to the circuit driving the high-current FET 56 to reduce or stop the flow of current through the FET 56. The processor U3 would also forward information on the fault to the truck display/control system 18 via the data links 37 and 36.

Having the processor U3 monitor the current flow also permits the processor U3 to determine if a change in current flow (a reduction or increase) from a "normal" current flow is indicative of a circuit failure. A reference value identifying a normal amount of current for a load in a trailer may be stored in a memory electrically connected to the processor U3. The reference value may be learned by the nicrocontroller circuit from observing the average amount of current flowing to the load over a period of time in normal operation, and stored by the microcontroller system in the memory. Alternatively, the reference value may be preprogrammed into the memory.

If a load, such as a light or a refrigerator unit, fails or otherwise functions improperly, the current drawn by the load may change from the reference value. If the change is outside a preprogrammed range, but is not indicative or a short or overload condition, the processor U3 may permit the current flow to continue, but also send a fault signal to the truck/display control system 18 to alert the operator of the truck of a possible circuit failure in the load. In place of monitoring current with a current sensor, those of ordinary skill in the art will recognize that the processor U3 may also monitor the flow of power by monitoring other aspects of power, such as voltage and impedance, at the output connector J1-1.

The FET protection and control circuit 44 shown in FIG. 4 further includes a transient voltage suppressor TZ2 on the output to provide protection from excessive transient voltages at the output connector J1-1. In one actual embodiment of the invention, the transient voltage suppressor TZ2 is a device manufactured under the trademark TransGuard® by AVX Corporation of Myrtle Beach, S.C., and connects the output on the connector J1-1 to ground in the event of a high-level, short-duration voltage spike (e.g., greater than 18 volts) on the output. Similar protection is provided by the transient voltage suppressor TZ1 for excessive voltages on the line $V_{batt}$.

Figure 5:
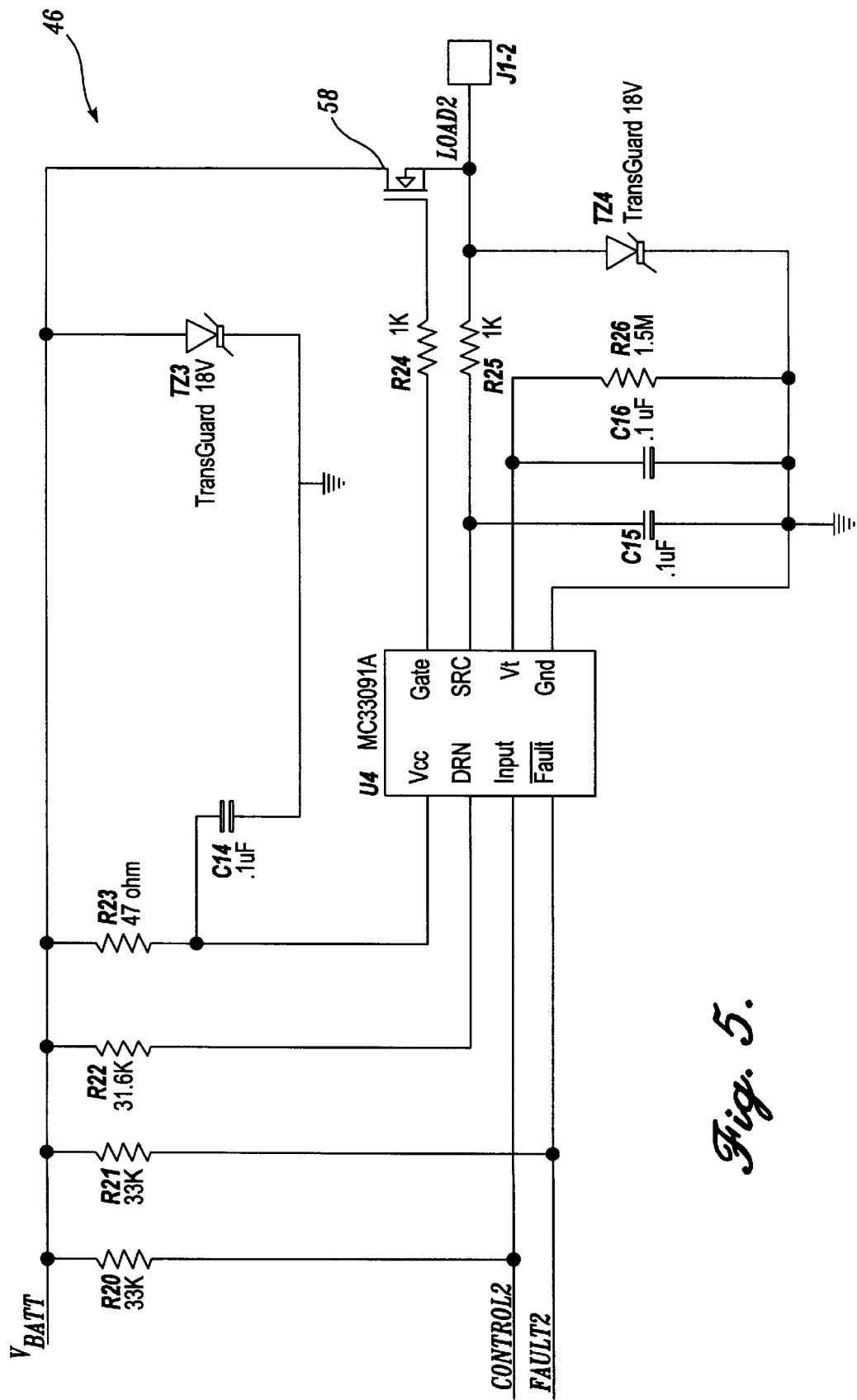
FIG. 5 is a schematic drawing of a FET protection and control circuit and high-power FET shown in the truck/trailer electrical interface illustrated in FIG. 1 that control the flow of electrical power from the power source to the left-turn signal lamps in the trailer.

FIG. 5 is a schematic drawing of the FET protection and control circuit 46. The FET protection and control circuit 46 is similar in design and operation to the FET protection and control circuit 44 shown in FIG. 4. When an appropriate signal (e.g., a high signal) is received from the processor U3 on the line Control2, a FET driver circuit U4 turns on the high-current FET 58, thereby connecting the electrical power on the line $V_{batt}$ to an output connector J1-2. When a contrary signal (e.g., a low signal) is received on the line Control2, the FET driver circuit U4 turns off the liigh-current FET 58, thereby interrupting the flow of current to the output connector J1-2. Since the FET protection and control circuit 46 controls the flow of current to the left-turn signal lamps of the trailer 34, as noted in FIG. 1, the output connector J1-2 is connected to the appropriate pin on the trailer connector 16 that leads to the left-turn circuit of the trailer 34. When fault conditions are detected at the output connector J1-2, the FET driver circuit U4 reports the fault condition to the processor U3 via the line Fault2.

The left-turn signal lamps of the trailer 34 blink on and off by permitting and interrupting the flow of electrical power to the left-turn circuit. In that regard, the processor U3 alternates between outputting a high signal and a low signal on the line Control2 to cause the FET driver circuit U4 to turn on and off the high-current FET 58, and consequently, turn on and off the left-turn signal lamps on the trailer 34.

Figure 6:
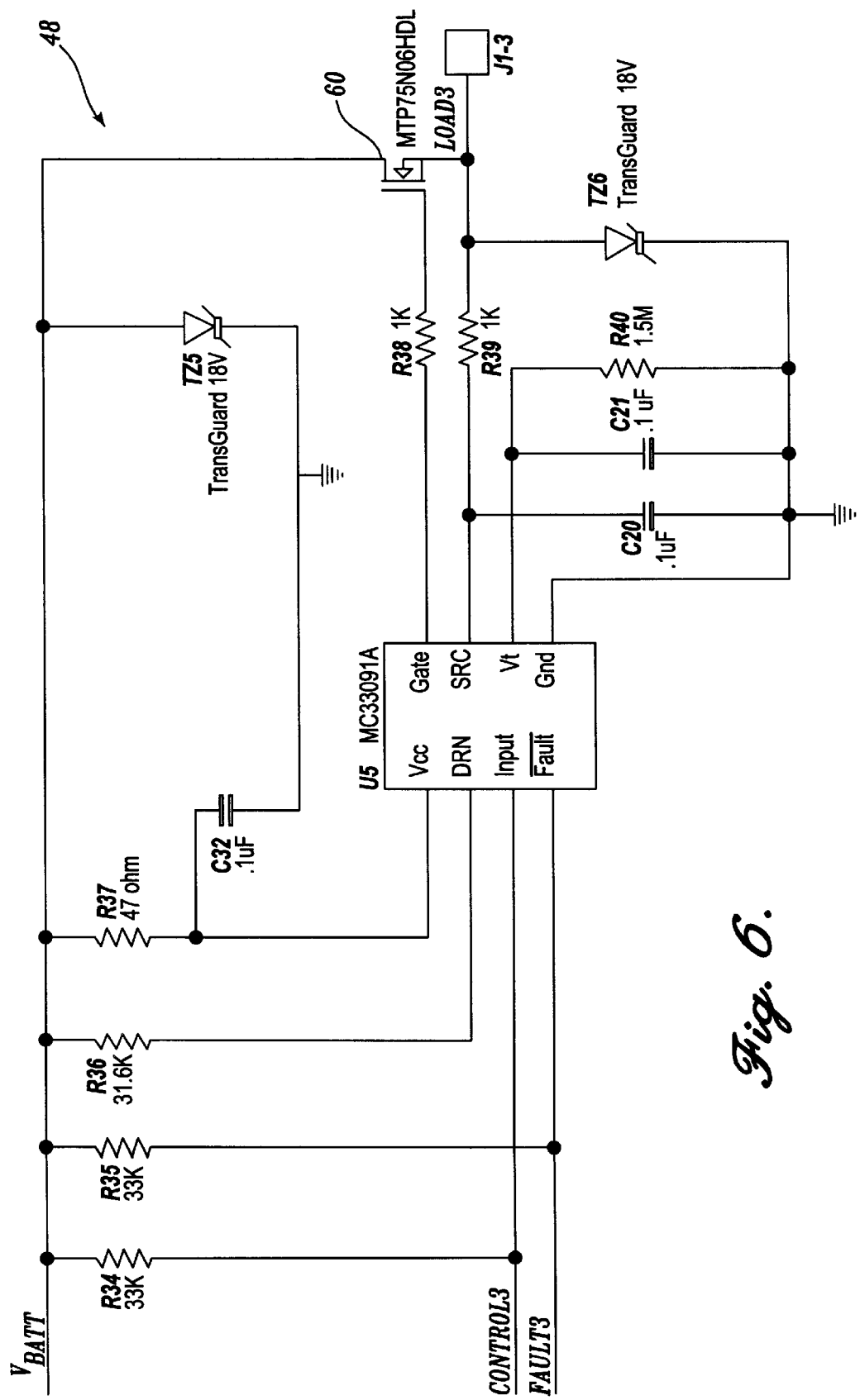
FIG. 6 is a schematic drawing of a FET protection and control circuit and high-power FET shown in the truck/trailer electrical interface illustrated in FIG. 1 that control the flow of electrical power from the power source to the stop/brake lamps in the trailer.

FIG. 6 is a schematic drawing of the FET protection and control circuit 48 that controls the flow of current to the stop/brake lamps of the trailer 34. The FET protection and control circuit 48 is similar in design and operation to the FET protection and control circuit 44 shown in FIG. 4. Control signals received from the processor U3 on the line Control3 determine when a FET driver circuit U5 turns the high-current FET 60 on and off, thereby permitting and interrupting the flow of power to an output connector J1-3. Fault conditions on the output connector J1-3 are reported to the processor U3 via the line Fault3.

Figure 7:
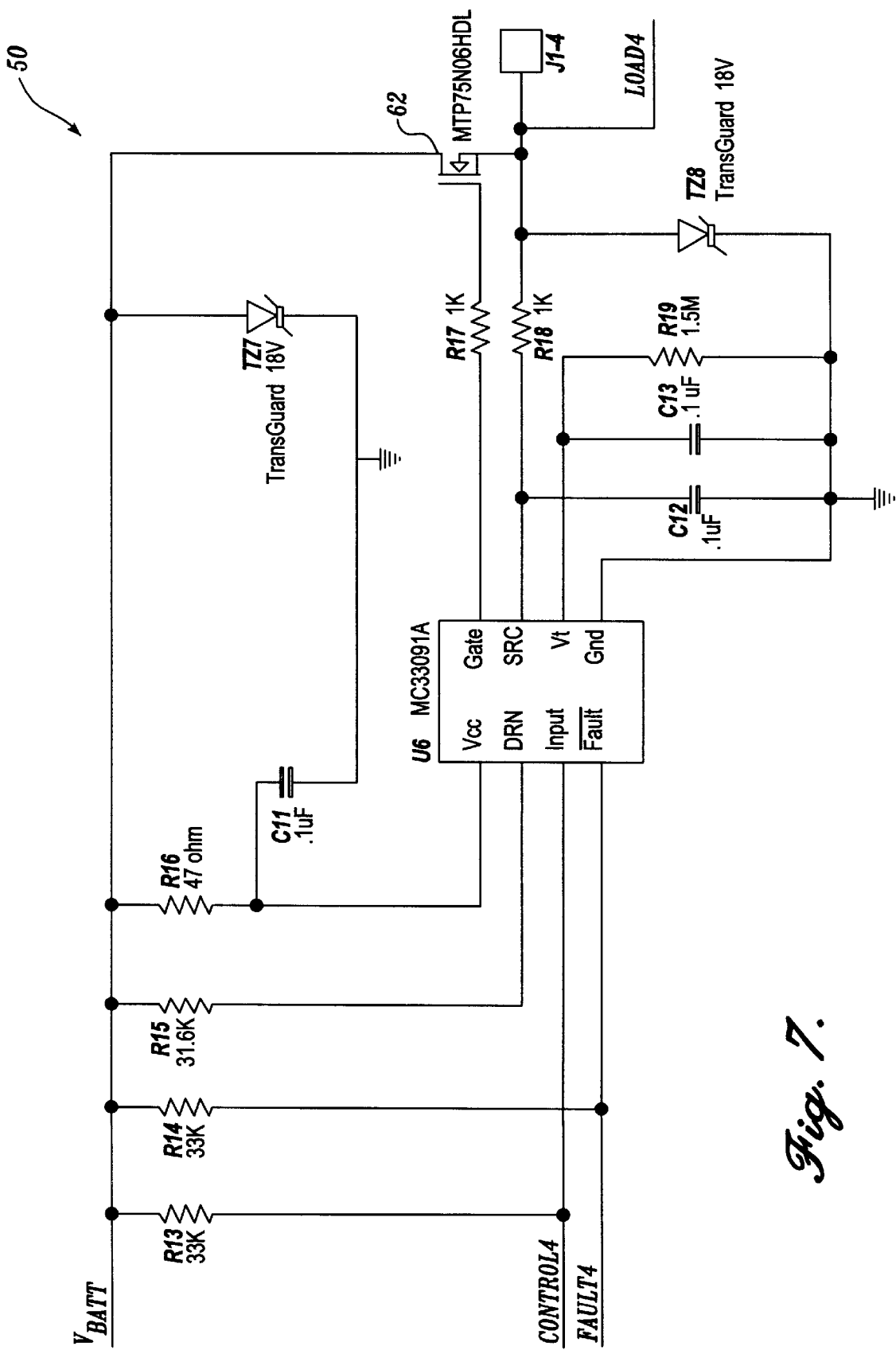
FIG. 7 is a schematic drawing of a FET protection and control circuit and high-power FET shown in the truck/trailer electrical interface illustrated in FIG. 1 that control the flow of electrical power from the power source to the right-turn signal lamps in the trailer, the output of the FET protection and control circuit also including an electrical connection with the daughter board connector shown in FIG. 3B.

FIG. 7 is a schematic drawing of the FET protection and control circuit 50 that controls the flow of current to the right-turn lamps on the trailer 34. In most respects, the FET protection and control circuit 50 is of similar design and operation as the FET protection and control circuit 44 shown in FIG. 4. When a FET driver circuit U6 turns on the high-current transistor 62, electrical power on the line $V_{batt}$ flows through an output connector J1-4 to the right-turn signal lamps on the trailer 34 via the appropriate pin on the trailer connector 16. The blinking of the right-turn signal may be accomplished as described above in reference to the left-turn signal. Fault conditions detected at the output connector J1-4 are reported by the FET driver circuit U6 to the processor U3 via the line Fault4.

FIG. 7 also illustrates a separate electrical line labeled Load4 connected to the output on the connector J1-4. As discussed earlier, the line Load4 is connected to the daughter board connector J2 illustrated in FIG. 3B. The connection of the line Load4 to the daughter board connector J2 allows external circuits that are plugged into the daughter board connector J2 to have electrical access to the right-turn signal circuit via the output connector J1-4.

Figure 8:
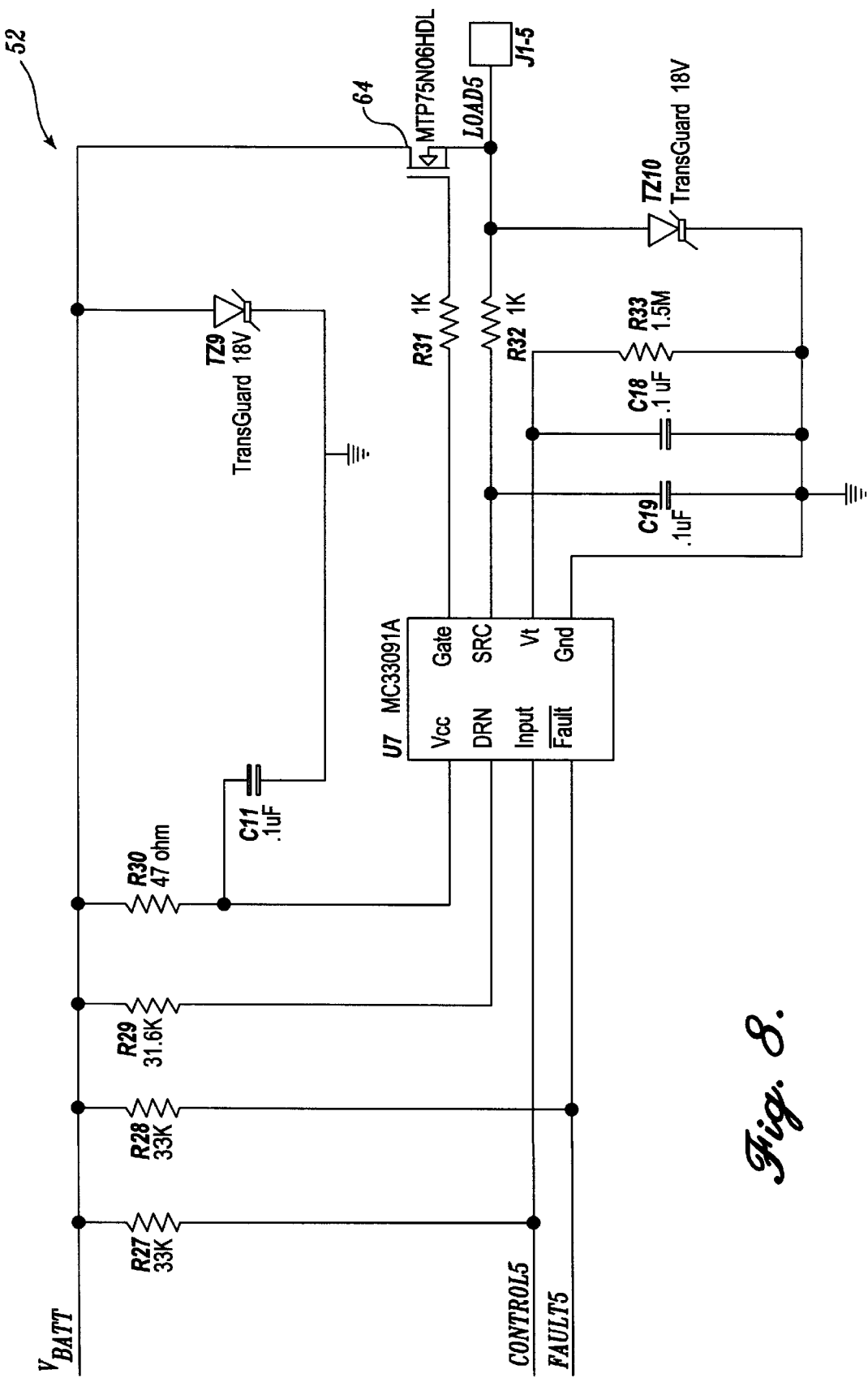
FIG. 8 is a schematic drawing of a FET protection and control circuit and high-power FET shown in the truck/trailer electrical interface illustrated in FIG. 1 that control the flow of electrical power from the power source to the marker lamps in the trailer.

FIG. 8 is a schematic drawing of the FET protection and control circuit 52 which is similar in operation and design to the FET protection and control circuit 44 shown in FIG. 4. Control signals received on the line Control5 determine when a FET driver circuit U7 causes the high-power FET 64 to permit electrical power to flow from line $V_{batt}$ to an output connector J1-5. The output connector J1-5 is connected to the appropriate pin on the trailer connector 16 that leads to the marker lamps on the trailer 34. Fault conditions detected by the FET driver circuit U7 at the output connector J1-5 are reported to the processor U3 via the line Fault5.

Figure 9:
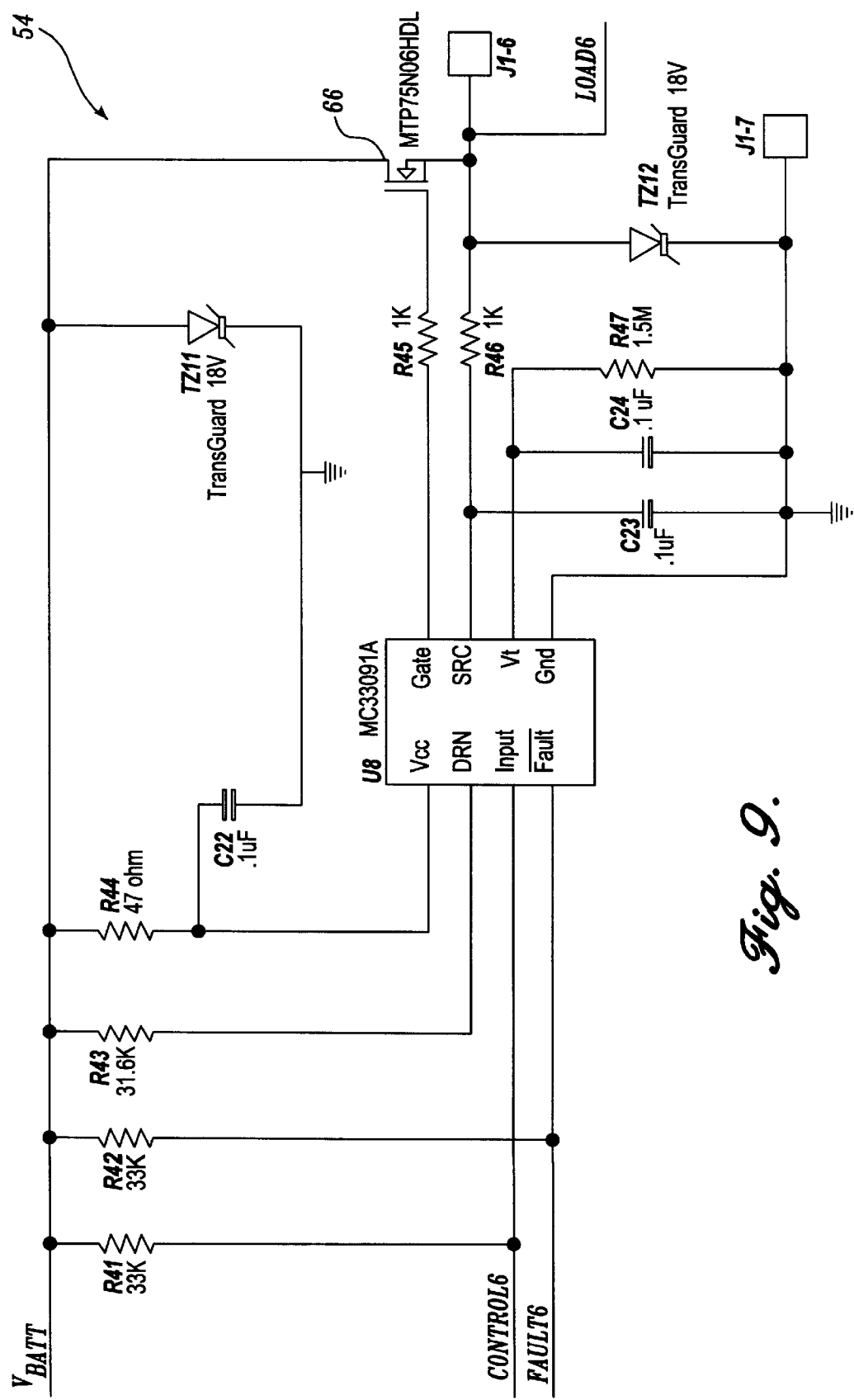
FIG. 9 is a schematic drawing of a FET protection and control circuit and high-power FET shown in the truck/trailer electrical interface illustrated in FIG. 1 that control the flow of electrical power from the power source to the auxiliary power circuit in the trailer, the output of the FET protection and control circuit also including an electrical connection with the daughter board connector shown in FIG. 3B.

Finally, FIG. 9 is a schematic drawing of the FET protection and control circuit 54 that controls the flow of electrical power through the high-current FET 66 to the auxiliary power circuit in the trailer 34. The FET protection and control circuit 54 includes a FET driver circuit U8 that responds to the control signals received from the processor U3 on the line Control6. The auxiliary power circuit in the trailer 34 is connected to an output connector J1-6 in FET protection and control circuit 54 by way of the appropriate pin on the trailer connector 16. Fault conditions sensed at the output connector J1-6 are reported to the processor U3 via the line Fault6.

The FET protection and control circuit 54 also features an electrical connection between the output connector J1-6 and the daughter board connector J2 (FIG. 3B) via the line labeled Load6. Furthermore, FIG. 9 illustrates the connection of output connector J1-7 to ground. The connector J1-7 is connected to the appropriate pin on the trailer connector 16 to provide a ground to the electrical circuits in the trailer 34.

In one actual embodiment of the invention, the trailer connector 16 is a 7-pin SAE J560 standard connector. The pins in the SAE J560 connector are connected to the output connectors J1-1, J1-2, J1-3, J1-4, J1-5, J1-6, and J1-7 as shown in FIGS. 4–9 according to Table 3 below.

TABLE 3

| SAE J560 Connector | Output Connector | Trailer Circuit |
| --- | --- | --- |
| Pin 2 | J1-1 | Clearance Lamps |
| Pin 3 | J1-2 | Left-Turn Lamps |
| Pin 4 | J1-3 | Stop/Brake Lamps |
| Pin 5 | J1-4 | Right-Turn Lamps |
| Pin 6 | J1-5 | Marker Lamps |
| Pin 7 | J1-6 | Auxiliary Power |
| Pin 1 | JI-7 | Ground |

Because the microcontroller system is built with solid state devices (i.e., the processing unit U3, the FET protection and control circuits 44, 46, 48, 50, 52, and 54, and the high-current FETs 56, 58, 60, 62, 64 and 66), the circuit resistance of the electrical interface 10 is greatly reduced in comparison with a conventional truck/trailer electrical interface. One actual embodiment of the electrical interface 10 has an estimated nominal resistance of 0.1 ohms. A lower circuit resistance in the electrical interface 10 results in a smaller voltage drop across the electrical interface when current is drawn through the electrical interface to circuits in the trailer. If a trailer circuit draws 5 amps of current through the electrical interface 10, the voltage drop across the electrical interface 10 is 0.5 volts. If the trailer circuit draws 9 amps of current, the voltage drop across the electrical interface 10 would be 0.9 volts. With a reduced voltage drop across the electrical interface 10 as compared to conventional electrical interfaces, the electrical interface 10 provides a greater amount of voltage to the trailer. Compare Table 4 below to Table 1.

TABLE 4

| Current | Battery Voltage | Drop Across Interface | Voltage Available to Trailer |
|---|---|---|---|
| 5 amps | 13.8 volts | 0.5 volts | 13.3 volts |
| 9 amps | 13.8 volts | 0.9 volts | 12.9 volts |
| 30 amps | 13.8 volts | 3.0 volts | 10.8 volts |

Furthermore, by using solid state devices to monitor and control the flow of current, the electrical interface 10 of the present invention eliminates the need for replaceable fuses to protect the trailer circuitry. The electrical interface 10 is also able to immediately isolate electrical systems with fault conditions and report the fault conditions to the operator of the truck.

In terms of providing feedback information from the trailer, sensors on the trailer detecting changes in cargo position, weight, tire wear, brake wear, etc., are able to communicate information through the electrical interface 10 to the operator of the truck when the electrical interface 10 includes communications circuitry (e.g., a power line carrier communications circuit) plugged into the daughter board connector J2. The electrical interface 10 provides a common interface point to provide additional data communication capabilities between a truck and a trailer.

While the preferred embodiment of the invention has been illustrated and described, it will be appreciated that various changes can be made therein without departing from the spirit and scope of the invention. For example, a trailer connector other than an SAE J560 connector may be used. Similarly, the electrical interface 10 may be used to switch power and protect any number of circuits in the trailer. Accordingly, it is not intended that the scope of the invention be limited by the disclosure of the actual embodiments described above. Rather, it is intended that the scope of the invention be determined by the following claims and equivalents thereof.

The embodiments of the invention in which an exclusive property or privilege is claimed are defined as follows:

1. An electrical interface for connecting a truck electrical system to a trailer electrical system, the interface comprising:
   a solid-state switching device for selectively connecting a power source in the truck electrical system to a circuit in the trailer electrical system to provide power to the circuit in the trailer electrical system;
   fault detection circuitry electrically connected to the solid-state switching device for detecting a fault in the provision of power to the circuit in the trailer electrical system, the solid-state switching device reducing the average flow of power or disconnecting the power source from the circuit in the trailer electrical system when a fault is detected by the fault detection circuitry; and
   a microcontroller system electrically connected to the truck electrical system and the solid-state switching device for receiving instruction signals from the truck electrical system and transmitting control signals to the solid-state switching device to control the flow of power from the power source to the circuit in the trailer electrical system in accordance with the instruction signals received from the truck electrical system.

2. The electrical interface of claim 1, wherein the fault detected in the provision of power to the circuit in the trailer electrical system is a short circuit condition.

3. The electrical interface of claim 1, wherein the fault detected in the provision of power to the circuit in the trailer electrical system is an overload condition in response to which the microcontroller system causes the solid-state switching device to reduce the average amount of power being provided to the circuit in the trailer electrical system.

4. The electrical interface of claim 1, wherein the fault detected in the provision of power to the circuit in the trailer electrical system is communicated to the microcontroller system and reported by the microcontroller system to the truck electrical system.

5. The electrical interface of claim 1, further comprising a plurality of solid-state switching devices, each solid-state switching device selectively connecting the power source to a corresponding circuit in a plurality of circuits in the trailer electrical system, wherein each solid state switching device is configured to reduce the average flow of power or disconnect the power source from the corresponding circuit in the trailer electrical system when a fault is detected in the provision of power to the corresponding circuit in the trailer electrical system.

6. The electrical interface of claim 1, wherein the solid-state switching device includes:
   a transistor switch electrically connected between the power source and the circuit in the trailer electrical system; and
   a transistor driver circuit electrically connected to the microcontroller system to receive control signals from the microcontroller system and selectively enable the transistor switch to conduct power from the power source to the circuit in the trailer electrical system in accordance with the control signals received from the microcontroller system.

7. The electrical interface of claim 6, wherein the transistor driver circuit is electrically connected to the output of the transistor switch to monitor the flow of power to the circuit in the trailer electrical system and disable the transistor switch from conducting power if a short circuit condition is detected in the circuit in the trailer electrical system.

8. The electrical interface of claim 6, wherein the transistor switch is a high-current field-effect transistor.

9. The electrical interface of claim 1, wherein the microcontroller system includes a processor electrically connected to the truck electrical system and the solid-state switching device for generating and sending control signals to the solid-state switching device to control the flow of power from the power source to the circuit in the trailer electrical system in accordance with the instruction signals received from the truck electrical system.

10. The electrical interface of claim 9, wherein the microcontroller system further includes a daughter board connector for connecting an external circuit to the electrical interface, the daughter board connector providing an electrical connection to the processor and an electrical connection to an output of the electrical interface through which power flows to the circuit in the trailer electrical system.

11. The electrical interface of claim 10, wherein the daughter board connector is configured to receive an external circuit that enables the processor to communicate data with the circuit in the trailer electrical system using the electrical connection to the output of the electrical interface.

12. The electrical interface of claim 9, wherein the microcontroller system further includes a transceiver electrically connected between the processor and a data bus in the truck electrical system for conveying data transmitted between the processor and the truck electrical system.

13. The electrical interface of claim 12, wherein the transceiver selectively isolates itself and the processor from the data bus in response to a data signal received from the processor, and wherein a pull-up circuit and a pull-down circuit electrically connected to the data bus place a weak data signal on the bus when the transceiver and processor are isolated from the data bus.

14. The electrical interface of claim 12, wherein the transceiver is a differential bus transceiver.

15. The electrical interface of claim 12, wherein the processor interrupts the transmission of data when a collision of data transmitted on the data bus is detected and retransmits the data after expiration of a predetermined period of time.

16. The electrical interface of claim 1, wherein the electrical interface further includes a protected power conversion circuit for converting power from the power source in the truck electrical system to provide a logic power to the solid-state switching device and microcontroller system.

17. A method of interfacing a truck electrical system with a trailer electrical system, comprising:
providing a solid-state switching device for selectively connecting a power source in the truck electrical system to a circuit in the trailer electrical system;
providing a microcontroller system electrically connected to the solid-state switching device;
providing fault detection circuitry electrically connected to the solid-state switching device for detecting a fault in the provision of power to the circuit in the trailer electrical system;
receiving at the microcontroller system instruction signals from the truck electrical system;
generating control signals at the microcontroller system and sending the control signals to the solid-state switching device to control the flow of power from the power source to the circuit in the trailer electrical system in accordance with the instruction signals received from the truck electrical system; and
causing the solid-state switching device to reduce the average flow of power or disconnect the power source from the circuit in the trailer electrical system when a fault is detected by the fault detection circuitry.

18. The method of claim 17, further comprising:
providing a plurality of solid-state switching devices, each solid-state switching device for selectively connecting the power source to a corresponding circuit in a plurality of circuits in the trailer electrical system;
generating control signals at the microcontroller system and sending the control signals to one or more of the solid-state switching devices to control the flow of power from the power source to one or more corresponding circuits in the trailer electrical system in accordance with the instruction signals received from the truck electrical system; and
causing a solid-state switching device to reduce the average flow of power or disconnect the power source from a corresponding circuit in the trailer electrical system when a fault is detected in the provision of power to the corresponding circuit in the trailer electrical system.

19. The method of claim 17, wherein the solid-state switching device includes a transistor switch electrically connected between the power source and the circuit in the trailer electrical system, and a transistor driver circuit electrically connected between the microcontroller system and the transistor switch, the method further comprising:
receiving control signals at the transistor driver circuit from the microcontroller system; and
selectively enabling the transistor switch to conduct power from the power source to the circuit in the trailer electrical system in accordance with the control signals received by the transistor driver circuit.

20. The method of claim 19, further comprising:
monitoring the flow of power from the power source to the circuit in the trailer electrical system; and
disabling the transistor switch from conducting power from the power source to the circuit in the trailer electrical system if a short circuit condition is detected in the circuit in the trailer electrical system.

21. The method of claim 17, further comprising communicating a fault detected by the fault detection circuitry to the microcontroller system, and reporting the detected fault from the microcontroller system to the truck electrical system.

22. The method of claim 17, further comprising providing a daughter board connector in the microcontroller system for connecting an external circuit to the electrical interface, the daughter board connector providing an electrical connection to an output of the electrical interface through which power flows to the circuit in the trailer electrical system, and connecting an external circuit to the daughter board connector that provides data communication between the microcontroller system and the circuit in the trailer electrical system using the electrical connection of the daughter board connector to the output of the electrical interface.

23. An electrical interface for connecting a truck electrical system to a trailer electrical system, the interface comprising:
a solid-state switching device for selectively connecting a power source in the truck electrical system to a circuit in the trailer electrical system to provide power to the circuit in the trailer electrical system; and
a microcontroller system electrically connected to the truck electrical system and the solid-state switching device for receiving instruction signals from the truck electrical system and transmitting control signals to the solid-state switching device to control the flow of power from the power source to the circuit in the trailer electrical system in accordance with the instruction signals received from the truck electrical system, the microcontroller system further receiving information on the amount of power flowing to the circuit in the trailer electrical system and if a change in power flow exceeds a predetermined range from a normal power flow, then reporting a fault condition to the truck electrical system.

24. The electrical interface of claim 23, wherein the solid-state switching device includes:
a transistor switch electrically connected between the power source and the circuit in the trailer electrical system; and
a transistor driver circuit electrically connected to the microcontroller system to receive control signals from the microcontroller system and selectively enable the transistor switch to conduct power from the power source to the circuit in the trailer electrical system in accordance with the control signals received from the microcontroller system, the transistor driver circuit also electrically connected to the output of the transistor switch to monitor the flow of power to the circuit in the trailer electrical system and provide information to the microcontroller system on the flow of power to the trailer electrical system.

25. The electrical interface of claim 23, wherein a value representing the normal power flow is preprogrammed and stored in a memory electrically connected to the microcontroller system.

26. The electrical interface of claim 23, wherein the microcontroller system determines the normal power flow based on an observation of average current flow over a period of time and stores a value representing the normal power flow in a memory electrically connected to the microcontroller system.

* * * * *